United States Patent [19]

Stratis

[11] 4,187,273
[45] Feb. 5, 1980

[54] METHOD OF PREFORMING A ONE-PIECE WALL COVERING

[76] Inventor: Melvin A. Stratis, 138 Beach Dr., Edmonds, Wash. 98020

[21] Appl. No.: 821,635

[22] Filed: Aug. 4, 1977

Related U.S. Application Data

[62] Division of Ser. No. 698,951, Jun. 23, 1976, Pat. No. 4,052,835.

[51] Int. Cl.² .......................... B29C 17/02; B29C 3/00
[52] U.S. Cl. .................................... 264/322; 264/348; 264/346; 264/237
[58] Field of Search ............... 264/295, 320, 322, 339, 264/237, 296, 234, 345, 346; 425/394; 52/309.1

[56] References Cited

U.S. PATENT DOCUMENTS

| | | | |
|---|---|---|---|
| 1,872,482 | 8/1932 | Messing | 264/339 |
| 2,420,119 | 5/1947 | Boehm | 264/339 |
| 2,648,370 | 8/1953 | Beach | 264/339 |
| 2,744,850 | 5/1956 | Schofield | 264/339 |
| 2,897,547 | 8/1959 | Weingand | 264/290 R |
| 2,953,427 | 9/1960 | Egger | 264/237 |
| 2,972,775 | 2/1961 | Baillie et al. | 425/394 |
| 3,020,596 | 2/1962 | Clapp et al. | 264/522 |
| 3,088,124 | 5/1963 | Long | 4/173 |
| 3,147,326 | 9/1964 | Harter | 264/320 |
| 3,281,516 | 10/1966 | Southwick | 425/394 |
| 3,312,585 | 4/1967 | Hamme | 52/309.13 |
| 3,491,177 | 1/1970 | Johnson | 264/237 |
| 3,574,807 | 8/1971 | Heavener | 264/339 |
| 3,588,925 | 6/1971 | Kuypers et al. | 4/173 R |
| 3,694,538 | 9/1972 | Okamoto et al. | 264/237 |
| 3,812,230 | 5/1974 | Takahashi | 264/237 |

*Primary Examiner*—W. E. Hoag
*Attorney, Agent, or Firm*—Delbert J. Barnard

[57] ABSTRACT

A single sheet of standard grade plastic laminate material is bent at two locations to form it into a side wall and two end walls corresponding to the side wall and two end walls of a bathtub recess. Following forming, one end wall portion of the wall covering is loosely folded over the opposite end wall portion. Then, the partially folded wall covering is pushed endwise into a rectangular cardboard box having a normal thickness which is substantially smaller than the initial depth of the partially folded wall covering. The box with the partially folded wall covering inside is moved through a rectangular opening provided in a rigid mandril, sized to be substantially equal to the normal outside dimension of the box. The mandril forces the outwardly bulging side walls of the box inwardly and reshapes both the side walls of the box and the side and end walls of the partially folded wall covering therein. In so doing, the end walls of the wall covering are slid in position an amount sufficient to cause the side and partially overlapped end walls of the wall covering to bow inwardly until the wall covering has assumed a new configuration which is substantially within the normal rectangular shape of the box. The frictional contact between the backing layer of the wall covering and inner surface portions of the box in contact therewith serve to hold the wall covering in such new configuration, so that the box will retain a substantially rectangular shape.

2 Claims, 8 Drawing Figures

U.S. Patent Feb. 5, 1980 Sheet 1 of 2 4,187,273
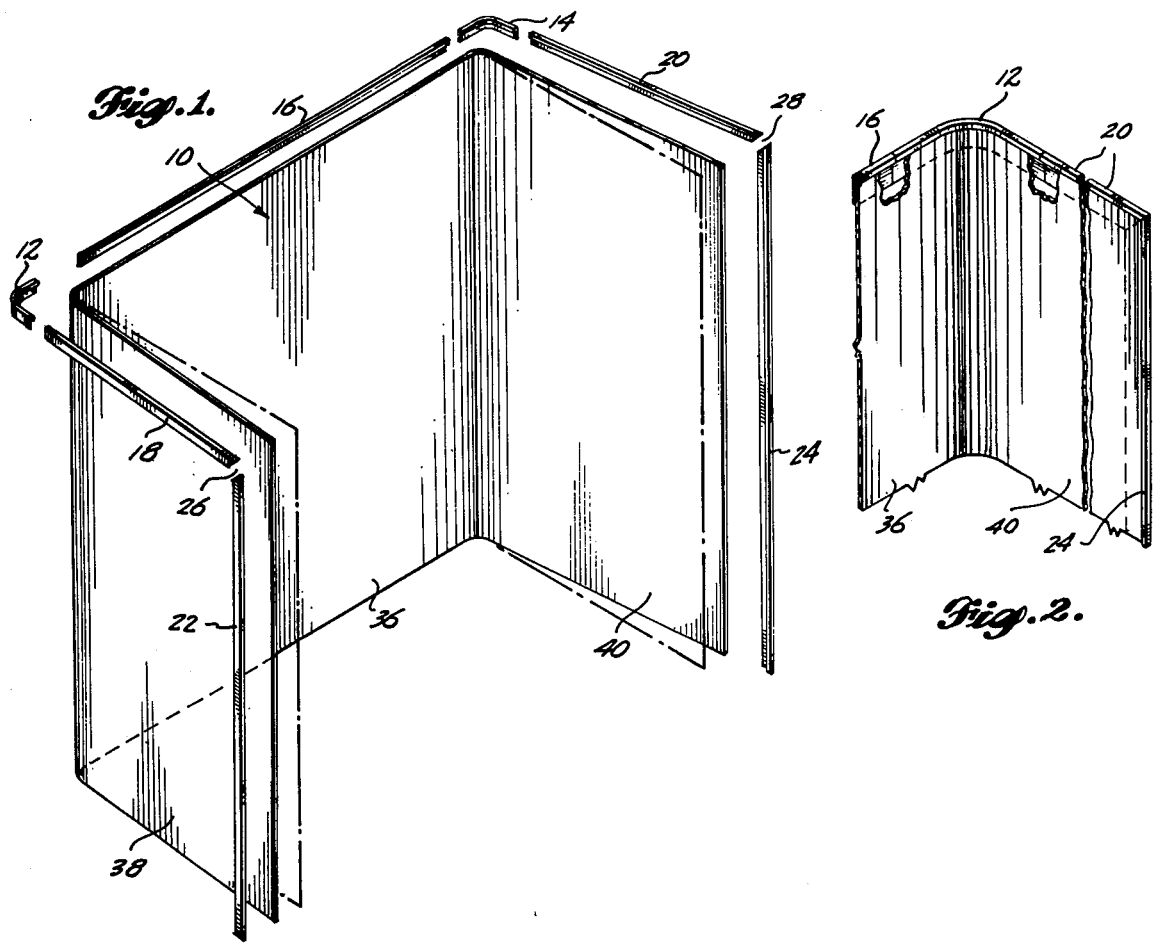
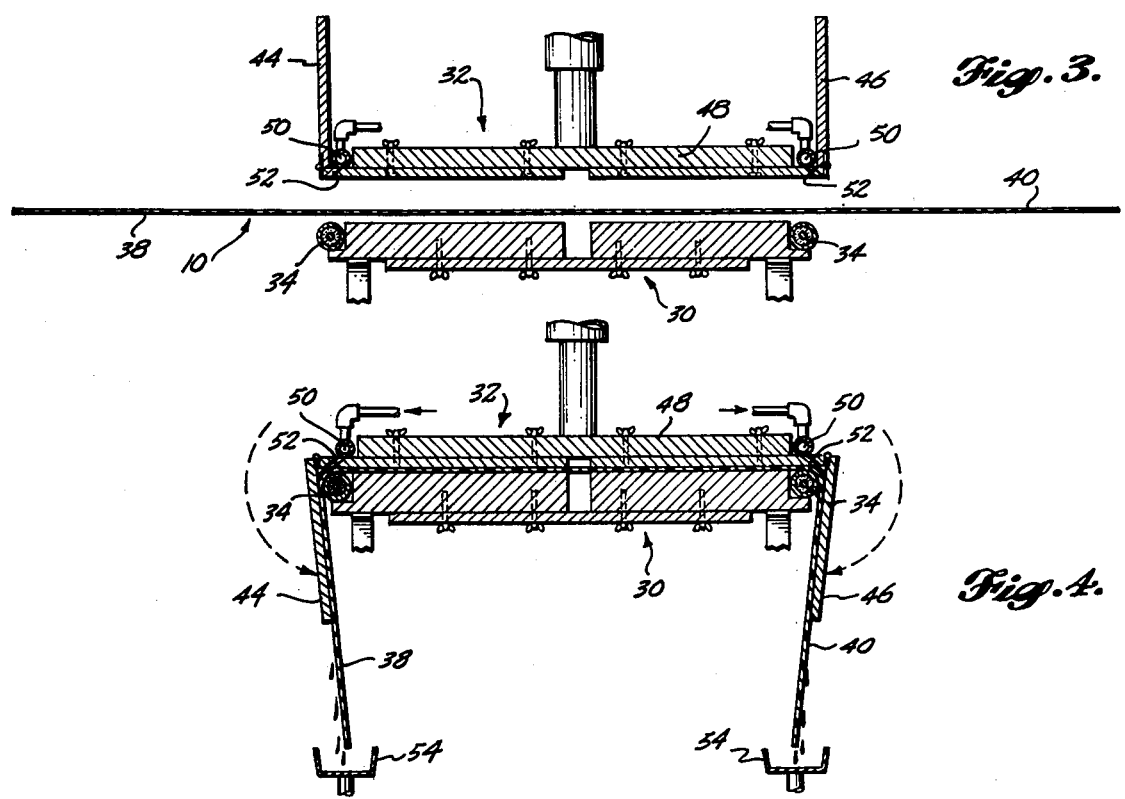

METHOD OF PREFORMING A ONE-PIECE WALL COVERING

CROSS-REFERENCE TO RELATED APPLICATION

This is a division of my copending application Ser. No. 698,951, filed June 23, 1976, now U.S. Pat. No. 4,052,835, and entitled PREFORMED ONE-PIECE WALL COVERING FOR A BATHTUB RECESS.

BACKGROUND OF THE INVENTION

1. Field of the Invention

This invention relates to a method of preforming a wall covering for a tub-recess from a single sheet of plastic laminate material, to a method of packaging such a pre-formed wall covering into a relatively shallow rectangular cardboard box, to forming equipment, and to the pre-formed one-piece wall covering product.

2. Description of the Prior Art

There are several multi-piece wall covering kits for tub recesses on the market today. A common kit comprises three flat panels of a sheet material (e.g. a plastic laminate) having a decorative face. One panel is installed on the side wall of the tub-recess. The other two panels are separately installed on the two end walls of the tub-recess. It is also known to preform from fiberglass all three walls of the tub-recess integrally with a fiberglass bathtub. However, prior to my invention, I am not aware of anyone having produced a preformed wall covering for the side and end walls of the tub-recess from a single sheet of plastic laminate material.

The art of bending sheet plastic materials into various shapes is also well known. The following are examples of known methods and/or apparatus on which U.S. Patents have been granted: No. 2,420,119, granted May 6, 1947, to Robert M. Boehm and Aaron A. Ladon; No. 2,744,850, granted May 8, 1956, to Christian A. Scofield; No. 2,897,547, granted Aug. 4, 1959, to Robert J. Clapp, Morton E. Latham and John G. Stansbury; No. 3,020,596, granted Feb. 13, 1962, to Robert J. Clapp and John E. Jamison; and No. 3,574,807, granted Aug. 13, 1971 to Edward A. Heavener. These patents should be consulted for the purpose of properly evaluating my invention and putting it into proper perspective with respect to the prior art.

I am also aware that the Formica Corporation of Cincinatti, Ohio has proposed bending its one-sixteenth inch Formica brand laminated plastic about a one and one-half inch diameter tube which is heated to a surface temperature of three hundred seventy-five degrees fahrenheit by a thermostatically controlled internal heater. The company's instructions include an instruction to overform the material by bending the material through a one hundred degree arc, and an instruction to wipe the sanded side of the formed area with water. These steps are outlined by the Formica Corporation in specifications for a post forming procedure.

SUMMARY OF THE INVENTION

According to an aspect of my invention, I locate a one-sixteenth inch sheet of a standard brand of plastic laminate material between a support bed and a press assembly of a forming apparatus. The bed includes a pair of parallel forming tubes having exterior forming surfaces and thermostatically controlled internal heating elements for controlling the temperature of the forming surfaces. The press assembly includes a pair of wing members which are movable to bend the end portions of the plastic laminate material about the two forming tubes. Following forming I temper the formed corner portions by applying water to them.

My preformed wall covering comprises a side wall and two end walls bent forwardly therefrom. The end portions of the preformed product normally make an angle with respect to the side portion which is greater than ninety degrees. As a result, the end portions must be bent inwardly towards each other during installation of the wall covering. This bending stores energy in the corner portions of the wall product which serves to bias the end walls of the wall covering towards the end walls of the tub-recess.

According to an aspect of the invention, I loosely fold one end wall of the wall covering partially over the opposite end wall. Then, I slide the partially folded wall covering endwise into a rectangular cardboard box having a normal thickness which is substantially less than the partially folded depth of the wall covering. Movement of the partially folded wall covering into the cardboard box causes the side walls of the box to bow outwardly. According to an aspect of my invention, I move the product containing box relatively through a rectangular opening provided in a rigid forming mandril. As the box moves relatively through the mandril its side wall, and the side and partially overlapping end walls of the wall covering therein, are pushed inwardly. The end walls of the wall covering slide over each other and the wall covering assumes a new configuration in which the side wall and partially overlapping end walls bow inwardly towards each other and the wall covering is within the normal rectangular dimensions of the cardboard box. Then, the end of the box is closed and sealed. Frictional contact between the wall covering and internal wall portions of the cardboard box maintain the wall covering in its new configuration, and the box rectangular in form. The cardboard box is used for transporting the product between the place of manufacture and the customer's premises whereat it is installed within a bathtub recess.

These and other features, objects and advantages of the present invention will be apparent from the detailed description of the preferred embodiment.

BRIEF DESCRIPTION OF THE DRAWING

FIG. 1 is a pictorial view, taken from above and looking towards the top, the front and the outside of one end of a one-piece preformed plastic laminate covering for a tub-recess wall constructed in accordance with the present invention, such view showing the end walls of said tub-recess covering in their formed positions in which they extend outwardly from the side wall of the tub-recess covering an amount greater than ninety degrees, and said view also showing the molding pieces which are installed on the upper and front edge portions of the tub-recess wall covering spaced in position relative to the edge on which they are installed;

FIG. 2 is a fragmentary portion of one corner and end wall portion of the tub-recess wall covering with the edge molding attached, with the portion of the end wall being broken away between the corner and its front edge;

FIG. 3 is a somewhat diagrammatic view, partially in elevation and partially in section, of the forming apparatus of the present invention, said view showing a sheet of plastic laminate to be formed located between a relatively fixed support bed and a relatively movable press assembly, with said press assembly being shown in spaced relationship from the support bed, and said view showing forming pressure applying wing portions of the press assembly in a retracted position;

FIG. 4 is a view similar to FIG. 3, but showing the press assembly moved downwardly against the intermediate portion of the sheet of plastic laminate material, and showing the forming pressure applying wing portions of the press assembly, and the end portions of the plastic laminate material in contact therewith, swung downwardly into a position at the end of their forming paths, and said view showing excess tempering water being collected by troughs provided for that purpose;

DESCRIPTION OF THE PREFERRED EMBODIMENT

Figure 6:
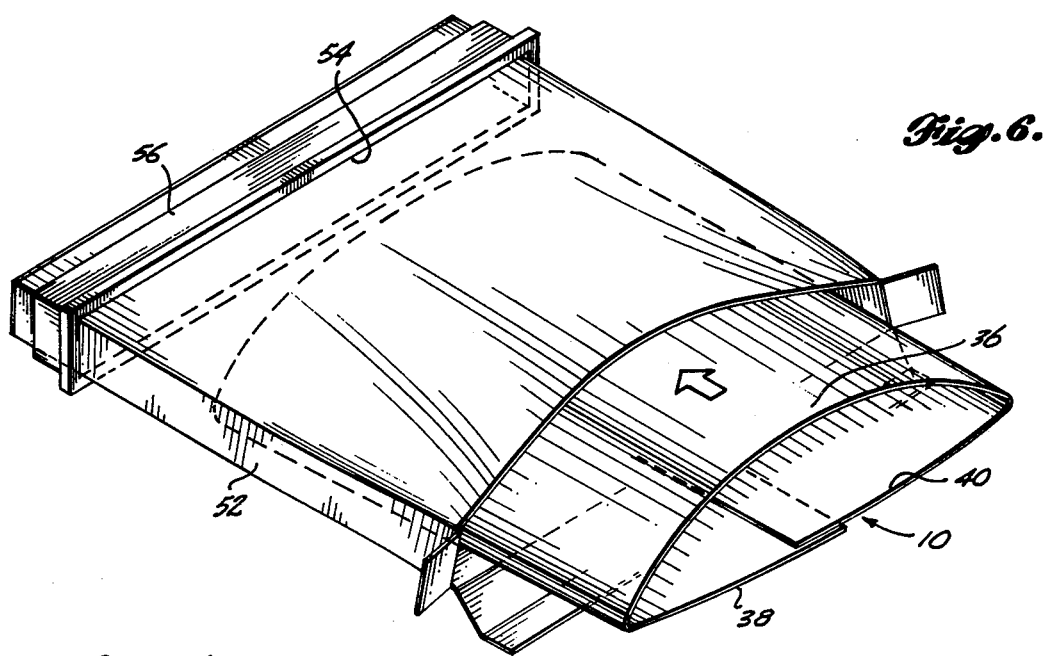
FIG. 6 is a pictorial view taken from above and towards one major side, one minor side and one end of a cardboard box for said tub-recess wall covering, said view showing the semi-folded tub-recess wall covering being moved relatively into the box, and showing the opposite end of the box situated in a forming mandril.

My tub-recess wall covering kit comprises a one-piece wall covering 10 which in preferred form is formed from a single sheet of general purpose grade (about 1/16 inch thick) plastic laminate material, such as Formica (trademark) or Wilson-Art (trademark). The kit may further include a plurality of pieces of edge molding. Specifically, the kit may include two prebent inside corner sections 12, 14; one straight upper rear edge section 16; two straight upper side edge sections 18, 20; and two straight forward edge sections 22, 24. Sections 18 and 22 are bevel cut at corner 26. Similarly, sections 20 and 24 are bevel cut at corner 28. The opposite ends of such section 18, 20, 22, 24, both ends of section 16, and the two ends of each of sections 12, 14 are straight cut.

The forming of the wall covering 10 will now be described.

A sheet of plastic laminate, preferably general purpose grade 1/16 inch thick, having a decorative layer on one side and a backing layer on its opposite side is placed between a support bed 30 and a press assembly 32. The plastic laminate material 10 may measure approximately five feet two inches in width and approximately ten feet in length. The material 10 is placed decorative layer down onto the support bed 30, as shown by FIG. 3. Support bed 30 carries a pair of elongated heating pipes 34, each of which includes a thermostatically controlled internal heating element. Tubes 34 include an outer forming surface of a predetermined radius, e.g. three-quarters of an inch radius. The tubes 34 are parallel to each other and are spaced apart a distance equal to the desired width of the side wall portion 36 of the wall covering 10. Plastic laminate 10 is centered with respect to the forming tubes 34, so that end wall portions 38, 40 thereof will be substantially equal in width.

Following proper location of plastic laminate 10 on the support bed 30, the press assembly 32 is lowered down onto the side wall portion of material 10. The forming tubes 34 are heated to the forming temperature of the plastic laminate material 10. By way of example, for forming 1/16 inch standard grade Formica brand laminate plastic or the like I preheat the internal heating elements to about three hundred seventy-five degrees Fahrenheit. Then, I increase the temperature by resetting the thermostat to about four hundred degrees and perform the forming steps as the temperature is rising. By following this procedure I am able to form a standard grade laminate without scorching it.

Press assembly 32 includes a pair of wing portions 44, 46 which are hinge connected to an intermediate portion 48 along hinge lines which extend parallel to the forming tubes 34. In operation, the wing portions 44, 46 are moved downwardly, either one at a time or together, for bending the end wall portions 38, 40 of the material 10 about the heated forming tubes 34. The bending occurs at a relatively slow but steady rate. Pressure is applied evenly by the wing members 44, 46 until the end wall portions 38, 40 have been moved through an arc greater than ninety degrees, e.g. one hundred degrees.

Heating of the forming tubes 34 is discontinued and water is applied to the backing layer side of the material 10 at the corners, in order to temper the material. The equipment shown by FIGS. 3 and 4 is equipped with a pair of spray bars 50, each having a plurality of outlet openings 52 spaced along its length, and each being positioned to discharge water onto the formed corners of the material 10. This type of arrangement is preferred because it results in a substantially simultaneous distribution of water to all regions of the corners, so that all regions of the corners will be substantially evenly tempered. Suitable trough structure 54, shown in section in FIG. 4, may be provided below support bed 30, to extend the full length of each spray bar 50 and function to collect any excess water which may be present.

Both the support bed 30 and the intermediate portion 48 of the press assembly 32 may be adjustable for the purpose of varying the spacing of the forming tubes 34 and the hinge lines for the wing portions 44, 46. By way of typical and therefore nonlimitative example, this adjustment may be easily done by constructing each means 30, 48 to include two side portions and a common base to which the side portions are connected by means of a plurality of fasteners which provide for adjustment of the positions of the side members relative to the common base. For example, the fasteners may comprise bolts carried by the side members which extend through slots formed in the common base which are elongated in the direction of desired adjustment, with wing type clamp nuts or the like being provided on the bolts.

A very important aspect of the invention involves the steps of packaging the wall covering 10 within a relatively small dimension cardboard box 52, following the forming operation. Placement of the preformed wall covering 10 within a box will now be described.

Figure 5:
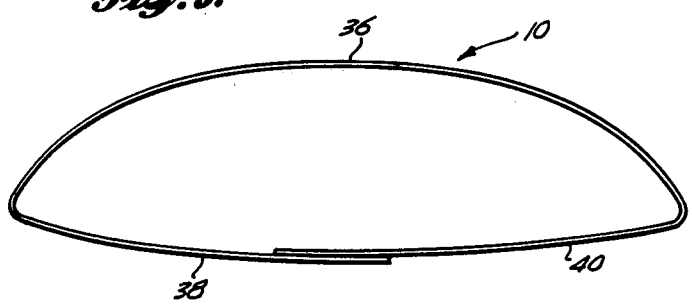
FIG. 5 is an end view of a tub-recess wall covering formed in accordance with the present invention, with one end wall thereof slightly overlapping the other, said view showing the outwardly bowed configuration which the tub-recess wall covering assumes when the two end walls are positioned in this manner.

Firstly, the wall covering 10 is partially folded into the configuration shown by FIG. 5. This is done by lapping one end wall (e.g. 40) over the other end wall (e.g. 38), to produce a configuration of said wall covering 10 in which the side wall 36 thereof bows outwardly in one direction and the partially overlapped end walls 38, 40 thereof bow outwardly in the opposite direction (see FIG. 5). Care is taken to not overstress the corner regions of the partially folded wall covering 10.

Next, this configuration is substantially maintained while one end of the partially folded wall covering 10 is introduced into an open end of the rectangular box 52. Box 52 is normally rectangular in form and is normally wider than the width of the partially folded wall covering 10 and has a normal depth that is substantially smaller than the depth dimension of the partially folded wall covering 10. This can be appreciated by comparing FIGS. 6-8 of the drawing.

Next, the partially folded wall covering is moved endwise into the box (FIG. 6) so that the outwardly bowing side and end walls thereof will in turn bow the side walls of the box outwardly (also FIG. 6).

Figure 8:
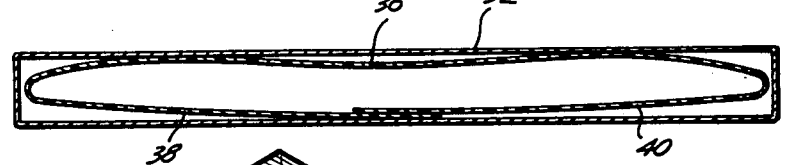
FIG. 8 is a view taken substantially along line 8—8 of FIG. 7, showing the stored configuration of the tub-recess wall covering within the box after use of the mandril.
Figure 7:
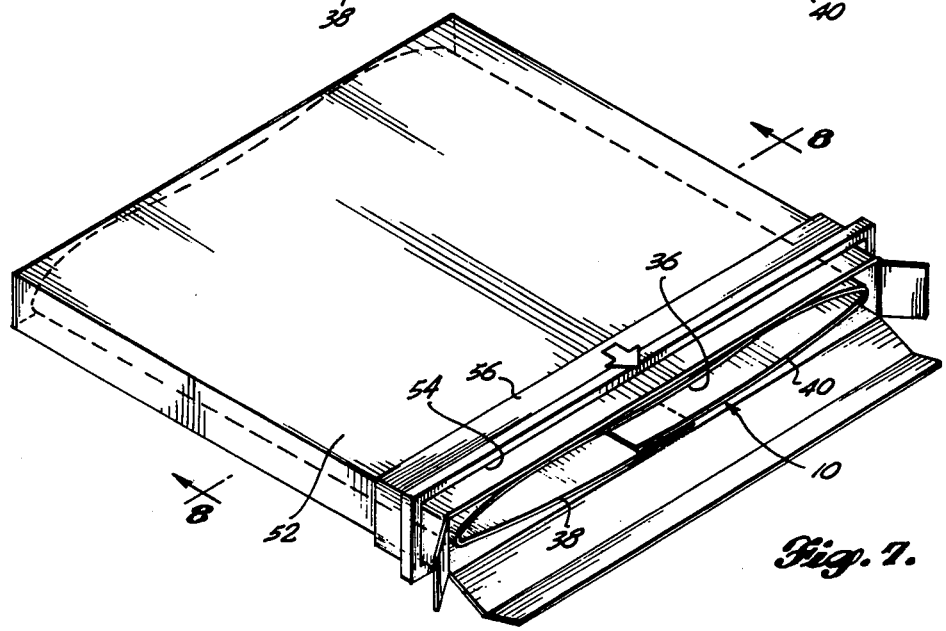
FIG. 7 is a view like FIG. 6, but showing the forming mandril moved into a position near the open end of the box, and showing the change in form of both the box and the tub-recess wall covering therein caused by such movement of the mandril.

Then, the box 52, with the outwardly bowed wall covering 10 therein, is moved relatively through a rectangular forming opening 54 of a rigid mandril 56. The opening 54 is sized to be substantially equal to the normal outside dimension of the box 52. As it moves the mandril 56 forces the two sides of the box 52 inwardly and reshapes both the side walls of the box and the side end walls of the wall covering 10 therein. As this is done, the end walls 38, 40 of the wall covering 10 are shifted in position an amount sufficient to cause the side and partially overlapped end walls of the wall covering 10 to bow inwardly until the wall covering 10 has assumed a new configuration which is substantially within the normal rectangular shape of the box (FIGS. 7 and 8).

Finally, the end of the box is closed and sealed.

It was found that the wall covering 10 retained its new configuration rather than returning to the outwardly bowed configuration. It is believed that this is because the frictional contact between the backing layer of the wall covering 10, which layer is relatively rough, and the inner surfaces of the cardboard box 52 in contact therewith, serve to hold the wall covering 10 in the new configuration.

When the wall covering 10 is inside the box its corner portions are not overly stressed and are protected by the rigid rectangular corner shape of the box.

As mentioned above, while being formed the end wall portions 38, 40 of the wall covering 10 are bent inwardly past a perpendicular position (FIG. 4). However, after the formed product 10 has cooled, including after it is removed from the box to be installed, the two end walls 38, 40 make an angle with respect to the side wall 36 which is greater than ninety degrees. This is shown by FIG. 1 in which the true position of the end walls 38, 40 is shown by full line and an exactly perpendicular position is shown by phantom line. Owing to this feature, when the wall covering 10 is set into place the two end walls 38, 40 must be swung inwardly towards the perpendicular position. This stresses the corner portions somewhat, storing energy in the material which tends to bias the end walls 38, 40 into contact with the end walls of the tub recess.

Also, it has been found that the wall covering 10 will easily adapt to a tub-recess that is not exactly regular, viz. the walls are not plumb and/or square with each other. If general grade material (1/16 inch thick) is used, the wall covering 10 may be installed without it being necessary for all portions of it to be flat against a wall portion of the tub-recess. The material is stiff enough to provide a solid installation even with some space existing behind say one or both of the corner portions of the tub-recess.

During installation it may be necessary to trim one or more of the edges of the wall covering 10, particularly if the tub-recess is not true. This can easily be done. If some cutting of the metal trim is necessary, it will involve only cutting off a portion of a squared end of one or more of the straight sections.

According to an aspect of the invention, I form the corner sections of trim 12, 14 by inserting a piece of the plastic laminate material in the slot provided therefore and then bending both such material and the trim piece together. Except for the selection and cut of the pieces, the edge material is the standard edge material which has been used for years in connection with plastic laminate material. It includes a relatively deep back flange portion which is hidden behind the plastic laminate material, a web which extends across an edge of the material, and a front flange which extends over a small edge portion of the front face of the plastic laminate material.

The invention may be embodied in other specific forms without departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A method of preforming a wall covering for three adjacent walls of a bathtub recess by bending a single sheet of standard grade heat softenable plastic laminate material which has a decorative layer on one side and a backing layer on the opposite side, to form two end walls connected to a side wall by two corner regions, including forming each said corner region by:

placing a substantially rectangular suitably sized sheet of said heat softenable plastic laminate material onto a support with a portion thereof which will become an end wall extending outwardly beyond an elongated forming tube which extends along a side of said support and has an outer forming surface of a predetermined radius, and with said decorative layer facing towards and contacting said support and said elongated forming tube;

applying pressure against said sheet of material to press it against said support and said forming tube while simultaneously heating said forming tube so that it will in turn preheat the portion of the plastic laminate material which is in contact with the forming tube only to a preheat temperature below the temperature at which the material becomes soft and can be bent;

then gradually increasing the temperature of the tube from within so that it in turn gradually increases the temperature of the material above said preheat temperature;

applying a steady pressure on the outwardly extending end wall portion of the material as the temperature is rising above said preheat temperature, so that such material will bend about the forming tube as soon as it becomes soft enough to bend, and continuing said bending until the end wall extends at a desired interior angle from the side wall, then discontinuing heating of the material so that the decorative face of the material will not be scorched; and applying moisture to the formed corner region while said formed corner region is still hot, for the purpose of tempering said formed corner region and substantially setting the shape of said formed corner region.

2. A method according to claim 1, comprising bending each end wall an amount sufficient so that following such bending and said tempering and setting each end wall is substantially flat and will naturally extend outwardly from said side wall at an interior angle that is greater than ninety degrees.

* * * * *